Oct. 1, 1963  H. E. THOMPSON ETAL  3,105,872
ELECTRIC CABLE
Filed Nov. 10, 1960

INVENTORS
H. E. THOMPSON, L. C. EBEL,
GEORGE FEICK III
BY V. F. Volk

THEIR AGENT

United States Patent Office 3,105,872
Patented Oct. 1, 1963

3,105,872
ELECTRIC CABLE
Henry E. Thompson, Dobbs Ferry, and Lawrence C. Ebel, Hastings on Hudson, N.Y., and George Feick III, Needham, Mass., assignors, by direct and mesne assignments, to Anaconda Wire and Cable Company, a corporation of Delaware
Filed Nov. 10, 1960, Ser. No. 68,534
8 Claims. (Cl. 174—120)

Our invention relates to electric cables and particularly to such cables having an insulation built up of a plurality of layers of polycarbonate film tapes.

Power cables and particularly large power cables used to transfer considerable quantities of electrical energy at high voltages have been constructed by applying a succession of spiral wrappings of thin tape around a more or less flexible conductor made from a low resistivity metal such as copper or aluminum. Successive layers of the tape are applied until an insulating wall has been built up sufficient to withstand the cable voltage. For the higher voltage cables, paper has been traditionally used as the insulating tape material although it has not been unknown to fashion tapes from other insulating materials such as varnished cambric.

Electrical cables are also known having insulating walls that are not built up from tapes but are solid and are applied by some process such as extrusion which will deposit an entire insulating wall as one homogeneous mass. The materials used for such solid cable insulation have been rubber, both natural and synthetic, and various plastics such as polyvinyl chloride and polyethylene. Although extruded solid walls of cable insulation would seem to have some obvious advanages such as simplicity and speed of application it is noteworthy that such cables are virtually unknown for service exceeding 35 kilovolts. Paper taped, oil saturated, insulations, on the other hand, are widely used for potentials in excess of 100,000 and even 200,000 volts.

Paper is, of course, a fibrous and porous material and is essentially lower in dielectric strength than the dense materials mentioned above for solid insulation, and the dielectric strength of oil is lower than that of paper. The explanation, then, of the superior dielectric performance of paper-oil cables at high voltages must reside in the form (i.e. tape wrappings) in which the insulation is applied. This has led to a search for materials superior to paper that could be applied in the form of tape wrappings to insulate electric cables. All the materials that have been suggested prior to the present invention have been unsuitable for reasons that include low softening point, solubility in cable oils, high power factor at cable temperatures, low tensile strength, and others. We have discovered that high voltage cables insulated with tape wrappings of polycarbonate film material benefit from the high dielectric strength of a solid film material and suffer none of the disadvantages of solid film tapes previously suggested.

Polycarbonate film material is composed of linear aromatic polyesters of carbonic acid. The ester of carbonic acid which in its polymerized form has proven most suitable to the purposes of this invention is the ester with 2,2-(4,4'-dihydroxydiphenylene) propane. It is known to prepare this polymer by heating the bis-phenylcarbonate of 2,2-di-(p-hydroxyphenylene)-propane along with small proportions of calcium hydride and sodium benzoate. A polymer having similar properties can be prepared by heating a mixture of the bis-phenylcarbonate of 2,2-di-(p-hydroxyphenylene)-propane and the bis-ethylcarbonate of 2,2-di-(p-hydroxyphenylene)-propane along with a small proportion of the sodium salt of 2,2-di-(p-hydroxyphenylene)-propane.

Polycarbonates of the type used in our invention may have a molecular weight from about 20,000 to over 200,000. Film is formed from the polymer by known methods of extrusion or of casting from a siutable solvent such as methylene chloride.

In the manufacture of electric cables for use at low voltages it is sufficient to wrap the cables with the number of layers of insulation required for the anticipated voltage service. At higher voltages, however, it is essential that the entire insulating volume be free from ionizable gases and for this reason, among others, high voltage cables manufactured with insulating tapes are thoroughly impregnated with a high quality insulating fluid. Such a fluid may be an oil or a gas, and it is known to maintain such fluids under pressure during the operation of the cable. Before introducing the fluid into the cable insulation the latter must be thoroughly evacuated. The oil is dried and deaerated and introduced into the insulation while the latter is still under vacuum. When the wall of insulaton is thick, which will be a characteristic condition for high-voltage cables, the evacuation of the last traces of entrapped moisture and air from the surface of tapes imbedded deep in the insulation wall becomes a time consuming operation which may add considerably to the overall cost of the cable. Cable made in conformance with our invention was evacuated completely within a commercially reasonable length of time.

It is essential that electric cables retain a considerable degree of flexibility so that they may be wound onto reels for delivery to the installation site and also for handling during the processes of manufacture. Cables insulated with solid walls of extruded rubber or plastic rely for their flexibility entirely on the inherent elasticity of the insulating material. Taped cables, on the other hand, can bend not only by virtue of stretching the material on the outside diameter of the bend and compressing the material on the inside diameter of the bend but also by permitting relative slippage of the tapes in adjacent layers. Thus the stiffness of a taped cable is a function not only of the modulus of elasticity of the insulating material but of the coefficient of friction between adjacent layers of tapes. This coefficient of friction is, as might be expected, considerably reduced by the presence of insulating oil. However, the cables must be capable of handling in the factory prior to the introduction of the oil, and particularly they must be taken up on reels as they leave the tape applying machine.

When a first attempt was made to manufacture electric cable with polycarbonate tape insulation the stress in the insulation was so great that the end of the cable, as it was released from the taping machine whipped around the take-up reel with great violence, making it obvious that it was impracticable to make a polycarbonate tape cable following the constructions that had been used for standard paper cables. Investigation of the coefficient of friction of polycarbonate film on polycarbonate film indicated a coefficient of friction of 0.47. The coefficient of friction of cable paper is known to be lower than 0.3. It was thus apparent that the higher coefficient of friction of polycarbonate film prevented free slippage between the layers and contributed significantly to the relative stiffness of a polycarbonate tape cable compared to a paper cable. We have discovered that a polycarbonate tape cable can be made with the thick insulation walls required for high voltages but still retaining an adequate degree of flexibility by using tapes that are smooth-surfaced but not flat so that there is limited frictional contact between adjacent layers of tape. Such a cable can be readily removed from the taping machine and handled during factory processing and field installation. This result is surprising in view of the fact that the classical theory of friction certifies that the frictional force is independent of the area of contact. This is usually stated in the formula $$F = \mu L$$

where F is the frictional force, $\mu$ is the coefficient of friction and L is the load or force acting normal to the surface. It should be noted that no expression appears in this equation to cover contact area. However we have found that the coefficient of friction upon itself of the polycarbonate tape used in the cable of our invention has a value of 0.32 compared to the coefficient of 0.47 obtained on flat polycarbonate tapes. A convenient method of preparing polycarbonate film tape to reduce its contact surface area is that of embossing a pattern on it. Since the tapes employed for electrical insulation are relatively thin having a thickness in the order of 2–5 mils and since it is desirable to retain an even dielectric strength through any area of the entire surface of the tape, the embossed tape will preferably be of uniform section with the pattern being reversed on the under side of the film.

Although it is advantageous because of the nature of polycarbonate film that tapes of this material used for insulating high voltage cable be embossed, we have discovered that the dielectric properties of a wall of insulation will be adversely affected if the fluid stratum between the insulating layers has an average value that is too high. The average fluid stratum thickness of any wall of insulation comprising a plurality of embossed tapes can be conveniently estimated by measuring the overall wall thickness, subtracting the thickness contributed by the totality of polycarbonate film (which will be equal to the individual film thickness times the number of layers) and dividing by the number of fluid strata in the section. We have found that the fluid stratum thickness calculated in this way should not exceed 0.5 mil at points near to the conductor of a high voltage cable, where the electrical stresses are most critical. On the other hand if the fluid strata are reduced below 0.05 mil the flexibility of the cable and the ease of evacuating will be adversely affected.

The thickness of the fluid stratum between two layers of embossed polycarbonate tape will depend upon the depth of the embossing, the stretching of the tape and the radial compression of the tape. We have discovered that in order to achieve the desideratum of low fluid stratum thickness hereinbefore disclosed the thickness of polycarbonate after embossing should exceed the thickness of the unembossed film by an amount no greater than 1 mil nor less than .02 mil, this value being true for tapes of widely different original film thicknesses. Under these conditions of embossing depth the tensions that are practical to apply in commercial taping machinery will produce compressions within the wall of a polycarbonate-film insulated power cable sufficient to smooth out the embossing and reduce the fluid stratum to within the desired value.

The pattern embossed on polycarbonate tape to be used on high voltage cable insulation should preferably have a random disposition of the hills and valleys to prevent any locking action of overlying tapes in the contour of the tapes underneath. If such locking occurs the sliding of adjacent tapes will be inhibited with a resultant loss in flexibility. Preferably the crests of hills embossed in the tape should not form a straight line since if it is curvilinear there is much less probability that a superimposed tape will have a matching valley to lock onto it.

Furthermore it should be noted that in the course of manufacturing a cable the tapes are wrapped on in automatic taping machines that apply considerable tension to them in the process. This has a tendency to flatten the tape surface, particularly if all the embossing extends crosswise of the tape. It is preferable therefore that the hills and valleys imparted to the surface of the tapes should extend lengthwise as well as crosswise of the same. It is also desirable that the crosswise valleys should provide a large number of continuous channels from edge to edge of the tapes since such channels will facilitate the removal of moisture and gas when the cable core is evacuated prior to the introduction of insulating fluid.

Regarding the fluid it has been known that a superior dielectric fluid for high voltage cables can be achieved by blending an aliphatic hydrocarbon oil with a minor amount of an aromatic constituent which absorbs the free hydrogen given off by aliphatic oils under electrical stress. Many different species of aromatics among which may be named phenols, and alkyl naphthalenes have been suggested as preservative additives to aliphatic hydrocarbons. Published data on polycarbonate resins have, however, indicated that polycarbonate is partially soluble in aromatics. It was surprising to find therefore that a polycarbonate-tape insulated cable saturated with an aliphatic cable oil containing 15–25% by weight of an aromatic degasifying oil, performs in an outstanding manner in high temperature aging tests.

Our invention comprises sheathed electric cables insulated with embossed polycarbonate tapes. Preferably the tapes are embossed in a random curvilinear pattern of hills and valleys extending both lengthwise and edgewise of the tape and providing channels from edge to edge thereof. The depth of the embossing adds no more than 2 mils and preferably 1 mil to the overall tape thickness with the result that the average thickness of the fluid films between tapes has a thickness of 0.05–0.5 mils. We have invented a polycarbonate film insulated cable that will perform well when permeated with aliphatic cable oil containing 5–35% and preferably 15–25% by weight of a degasifying aromatic oil.

A further understanding of our invention may be obtained by reference to the drawings.

Figure 1:
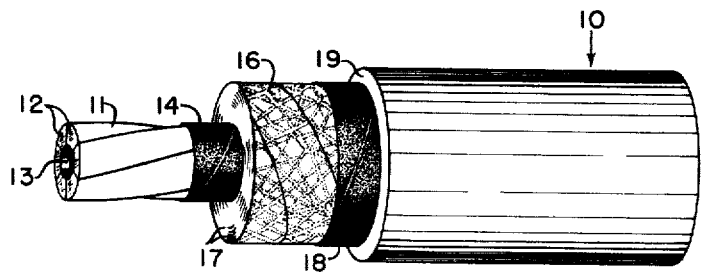
FIG. 1 is a cut-away perspective view of a cable made to our invention.

Referring to FIG. 1 the cable indicated generally at 10 has a metallic conductor 11 comprised of a plurality of segments 12. The conductor 11 is of the hollow type defining an inner tubular channel 13 for the passage of insulating fluid. It will be understood, however, that our invention is not limited to any specific sectional configuration of the conductor 11 and that solid and concentric stranded conductors may be acceptable for many purposes. The conductor 11 is wrapped with electrically conducting strand shielding tape 14 and covered with a wall 16 comprised of a plurality of layers 17 of embossed polycarbonate tape. The insulation 16 is covered with shielding tapes 18 and the whole is enclosed in a lead sheath 19. Other forms of sheath may also be used within the area of our invention. Particularly a plurality of cables such as three may be combined together within a pipe which will enclose the cables and confine the insulating fluid. The word "sheath" as used in this application includes such pipes and elongated containing means capable of containing dielectric cable fluid.

Figure 2:
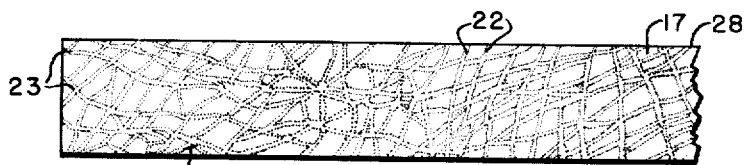
FIG. 2 is a plan of a tape used in our invention.
Figure 3:
FIG. 3 is an enlarged section of the tape of FIG. 2.

One of the embossed polycarbonate tapes 17 is shown more particularly in FIG. 2. The film thickness is designated at $t$ and the overall thickness of the embossed tape at T. The increase in overall thickness of the film contributed by the embossing will be equal to $T-t$ and has a value less than 2 mils, preferably equal to 1 mil. An upper surface 21 of the tape 17 is marked by lateral hills 22 running crosswise of the tape and lengthwise hills 23 extending generally lengthwise of the tape 17. A hill 24 on the upper surface 21 of the tape is typically identified with a valley 26 on the lower surface 27 of the tape 17. The hills and valleys 24, 26 are conveniently applied to a flat tape by embossing with an embossing roll bearing the desired pattern. Other methods of producing the required irregularities may be employed, however, and the expression "embossed tape" is used in this application, means a tape having the desired contour without limitation to the method of obtaining it.

In the preferred embodiment of our invention the thickness t of the tape 17 is uniform throughout. This has the obvious advantage of maintaining a uniform dielectric strength and electrical capacitance across the tape thickness. It is conceivable that tapes wherein the thickness t varies will also be serviceable and we wish to include such tapes within the scope of our invention.

The tape 17 has necessarily an edge 28 and an opposing parallel edge 29. The drawing shows that a major proportion of the lateral hills 22 either extend completely across the tape from the edge 28 to the edge 29 or are interconnected with lengthwise hills so as to form a network that links both the edges 28, 29. It is desirable to avoid any isolated valleys forming pockets of stagnant fluid. Inspection of FIG. 2 discloses that the pattern of hills and valleys in the tape 17 is random and non-repeating.

The choice of an embossing pattern for polycarbonate tape was found to have an effect on the coefficient of friction additional to the effect induced by the interlocking of non-random hills and valleys. This was determined by measuring the resistance to withdrawal of strips of steel pressed between polycarbonate tapes. To make the tests strips of steel $3/16$ inch wide; 1.5 mils thick, and 4 inch long were polished, refluxed in acetone and stored in a desiccator. The tapes to be tested were placed between weighted horizontal platens with the steel strip sandwiched between two tapes. The coefficient of friction was determined from the tension required to pull the steel from between the tapes. When the above method was used to compare polycarbonate tapes embossed in accordance with FIG. 2 with plain tapes, and also with tapes embossed in a rectilinear pebbly pattern, the results of Table I were obtained:

*Table I*

| | Coefficient of friction |
|---|---|
| Plain polycarbonate tape | 0.21 |
| Pebbly embossed polycarbonate | 0.18 |
| Polycarbonate embossed as per FIG. 2 | 0.06 |

No theoretical explanation is readily forthcoming for the surprising results indicated in Table I but the practical significance is one of great importance to the cable art enabling us to make a heavy-walled cable from tapes of polycarbonate material which would otherwise be too stiff to handle.

We have invented a new and useful article of manufacture for which we desire the issuance of Letters Patent. We claim:

1. An electric cable comprising a conductor, a plurality of layers of embossed polycarbonate film tape insulation wrapped around said conductor, said embossed tape having a coefficient of friction upon itself lower than the coefficient of friction of the same tape upon itself prior to embossing, dielectric fluid permeating said insulation, and an impervious sheath enclosing said insulation and said fluid.

2. An electric cable comprising a conductor, a plurality of layers of polycarbonate film tape insulation wrapped around said conductor, said tape being embossed in a pattern of random hills and valleys, dielectric fluid permeating said insulation, and an impervious sheath enclosing said insulation and said fluid.

3. An electric cable comprising a conductor, a plurality of layers of polycarbonate film tape insulation wrapped around said conductor, said tape being embossed in a pattern of random, curvilinear hills and valleys extending both longitudinally and laterally of said tape at least a majority of said laterally extending valleys being continuous from edge to edge of said tape, dielectric fluid permeating said insulation, and an impervious sheath enclosing said insulation and said fluid.

4. An electric cable comprising a conductor, a plurality of layers of embossed polycarbonate film tape insulation wrapped around said conductor, said embossed tape having a coefficient of friction upon itself lower than the coefficient of friction of the same tape upon itself prior to embossing, said tape having a substantially uniform film thickness, dielectric fluid permeating said insulation, and an impervious sheath enclosing said insulation and said fluid.

5. An electric cable comprising a conductor, a plurality of layers of polycarbonate film tape insulation wrapped around said conductor, said tape having a substantially uniform film thickness and said tape being embossed to have an overall thickness in its uncompressed state no greater than 2 mils nor less than 0.2 mil in excess of said uniform film thickness, dielectric fluid permeating said insulation, and an impervious sheath enclosing said insulation and said fluid.

6. An electric cable comprising a conductor, a plurality of layers of embossed polycarbonate film tape insulation wrapped around said conductor, said tape having a substantially uniform film thickness, the plurality of said layers having a combined thickness exceeding the combined thickness of said films by an amount in mils from 0.05–0.5 times the number of tapes comprising said plurality of layers, dielectric fluid permeating said insulation, and an impervious sheath enclosing said insulation and said fluid.

7. An electric cable comprising a conductor, a plurality of layers of polycarbonate film tape around said conductor, an insulating fluid permeating said layers said fluid comprising 65–95% by weight of aliphatic hydrocarbon oil and 5–35% by weight of aromatic degassifying oil, and an impervious sheath enclosing said insulation and said fluid.

8. An electric cable comprising a conductor, a plurality of layers of polycarbonate film tape around said conductor, an insulating fluid permeating said layers said fluid comprising 75–85% by weight of aliphatic hydrocarbon oil and 15–25% by weight of aromatic degasifying oil, and an impervious sheath enclosing said insulation and said fluid.

References Cited in the file of this patent

UNITED STATES PATENTS

| 2,038,935 | Hunter et al. | Apr. 28, 1936 |
| 2,102,974 | Robinson | Dec. 21, 1937 |
| 2,176,952 | Berberich | Oct. 24, 1939 |
| 2,999,845 | Goldberg | Sept. 13, 1961 |
| 3,025,340 | Olson | Mar. 13, 1962 |
| 3,077,514 | Kang | Feb. 12, 1963 |

FOREIGN PATENTS

| 839,858 | Great Britain | June 29, 1960 |

OTHER REFERENCES

Polycarbonates, British Plastics, March 1958, pages 112–114.

UNITED STATES PATENT OFFICE

CERTIFICATE OF CORRECTION

Patent No. 3,105,872                          October 1, 1963

Henry E. Thompson et al.

It is hereby certified that error appears in the above numbered patent requiring correction and that the said Letters Patent should read as corrected below.

Column 1, line 34, for "advanages" read -- advantages --; column 2, line 20, for "insulaton" read -- insulation --; column 3, line 48, for ".02" read -- 0.2 --; column 6, line 6, after "and" insert -- an --.

Signed and sealed this 7th day of April 1964.

(SEAL)
Attest:

ERNEST W. SWIDER

Attesting Officer

EDWARD J. BRENNER

Commissioner of Patents